(12) United States Patent
Christmann et al.

(10) Patent No.: US 9,278,751 B2
(45) Date of Patent: Mar. 8, 2016

(54) HIGH LIFT SYSTEM FOR AN AIRCRAFT

(71) Applicant: Airbus Operations GmbH, Hamburg (DE)

(72) Inventors: Markus Christmann, Munich (DE); Christoph Giebeler, Bremen (DE); Martin Recksiek, Hamburg (DE); Bjoern Dorr, Stuhr (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 244 days.

(21) Appl. No.: 14/044,960

(22) Filed: Oct. 3, 2013

(65) Prior Publication Data

US 2014/0027580 A1   Jan. 30, 2014

Related U.S. Application Data

(63) Continuation of application No. PCT/EP2012/056350, filed on Apr. 5, 2012.

(60) Provisional application No. 61/473,030, filed on Apr. 7, 2011.

(30) Foreign Application Priority Data

Apr. 7, 2011   (DE) .................. 10 2011 016 336

(51) Int. Cl.
*B64C 3/50*   (2006.01)
*H02K 3/28*   (2006.01)
*B64C 9/16*   (2006.01)
*B64C 9/22*   (2006.01)
(Continued)

(52) U.S. Cl.
CPC ... *B64C 3/50* (2013.01); *B64C 9/16* (2013.01); *B64C 9/22* (2013.01); *B64C 13/24* (2013.01); *B64C 13/50* (2013.01); *H02K 3/28* (2013.01); *Y02T 50/44* (2013.01)

(58) Field of Classification Search
USPC .......................................... 318/563, 564, 538
See application file for complete search history.

(56) References Cited

U.S. PATENT DOCUMENTS 4,434,389 A * 2/1984 Langley et al. .......... 318/400.41
4,455,515 A * 6/1984 Uzuka ...................... 318/400.09
(Continued)

FOREIGN PATENT DOCUMENTS

CN    101331056 A    12/2008
DE    3922410 A1     1/1991
(Continued)

OTHER PUBLICATIONS

International Searching Authority, International Search Report for PCT International Application No. PCT/EP2012/056350, mailed Dec. 4, 2012.
(Continued)

*Primary Examiner* — Bentsu Ro
(74) *Attorney, Agent, or Firm* — Ingrassia Fisher & Lorenz, P.C.

(57) ABSTRACT

A high lift system for an aircraft, which extends and retracts the landing flaps of the aircraft in a fully electric manner. In this context, a fully electric drive is used, comprising an electric motor having an internal redundancy, in such a way that the electric motor is configured as a fault-tolerant electric motor. It may thus be possible to do without a coupling gear unit in the electric motor.

18 Claims, 3 Drawing Sheets

(51) Int. Cl.
*B64C 13/50* (2006.01)
*B64C 13/24* (2006.01)

(56) References Cited

U.S. PATENT DOCUMENTS

| | | |
|---|---|---|
| 4,858,490 A | 8/1989 | Grant |
| 4,896,088 A | 1/1990 | Jahns |
| 4,918,347 A | 4/1990 | Takaba |
| 5,028,828 A | 7/1991 | Felkai et al. |
| 5,214,972 A | 6/1993 | Larson et al. |
| 5,239,217 A | 8/1993 | Horst |
| 5,517,102 A | 5/1996 | Jensen |
| 5,568,034 A | 10/1996 | Huggett et al. |
| 5,929,549 A | 7/1999 | Trago et al. |
| 5,990,590 A | 11/1999 | Roesel, Jr. et al. |
| 6,020,711 A | 2/2000 | Rubertus et al. |
| 6,208,923 B1 | 3/2001 | Hommel |
| 6,320,731 B1 | 11/2001 | Eaves et al. |
| 6,577,095 B1 | 6/2003 | Firehammer |
| 6,705,570 B1 * | 3/2004 | Degenholtz et al. ......... 244/99.2 |
| 6,791,215 B2 | 9/2004 | Tesar |
| 6,885,162 B2 | 4/2005 | Stridsberg |
| 6,949,908 B2 | 9/2005 | Maslov et al. |
| 7,388,311 B2 * | 6/2008 | Bhargava ..................... 310/184 |
| 7,443,642 B2 | 10/2008 | Dooley |
| 7,834,494 B2 | 11/2010 | Blanding et al. |
| 8,080,966 B2 * | 12/2011 | Potter et al. ................... 318/625 |
| 2006/0042858 A1 | 3/2006 | Boyle et al. |
| 2009/0072083 A1 | 3/2009 | Hanlon et al. |
| 2010/0253168 A1 | 10/2010 | Herrmann |

FOREIGN PATENT DOCUMENTS

| | | |
|---|---|---|
| EP | 1519477 A1 | 3/2005 |
| WO | 9414226 | 6/1994 |
| WO | 9517035 | 6/1995 |

OTHER PUBLICATIONS

International Searching Authority, Written Opinion for PCT International Application No. PCT/EP2012/056350, mailed Dec. 4, 2012.
State Intellectual Property Office of the Peoples' Republic of China, Office Action for Chinese Patent Application No. 201280027739.0 mailed Feb. 2, 2015.
State Intellectual Property Office of the Peoples' Republic of China, Office Action for Chinese Patent Application No. 201280027739.0 mailed Aug. 25, 2015.

* cited by examiner

HIGH LIFT SYSTEM FOR AN AIRCRAFT

CROSS-REFERENCE TO RELATED APPLICATIONS

This is a continuation of International Application No. PCT/EP2012/056350, filed Apr. 5, 2012, which claims priority to German Patent Application No. 10 2011 016 336.0, filed Apr. 7, 2011, and to U.S. Provisional Patent Application No. 61/473,030, filed Apr. 7, 2011, which are each incorporated herein by reference in their entirety.

TECHNICAL FIELD

This application pertains to driving lift systems in aircraft. In particular, the technical field relates to a high lift system for an aircraft, to an aircraft comprising a high lift system and to use of an electric motor to drive a high lift system.

BACKGROUND

Conventional high lift systems comprise leading edge flaps (slats) and trailing edge flaps (flaps), which are driven via a power control unit (PCU). This power control unit generally consists of two hydraulic motors which are connected by a speed-adding gear unit. The drive torque is transferred to the individual drive stations via a transmission shaft system. Each drive station consists of a branch gear unit, a station force limiting device and a planetary gear set (rotation actuator). From the planetary gear set, the drive forces are introduced into the landing flap via lever arms. As a result, the landing flap travels along a guide rail to the corresponding end position which was previously specified via the switch in the cockpit (flap lever).

As well as the speed-adding gear unit, a torque-adding gear unit may also be used as a coupling gear unit.

In this context, for redundancy, in both cases the power control unit consists of two motors interconnected by a gear unit. If a fault occurs in one of the two motors, the high lift system is driven by the remaining motor. Because of the rotational-speed-adding gear unit, a fault with one motor may cause the retraction and extension time of the high lift system to increase.

Furthermore, with speed-adding coupling gear units a brake and an actuation unit may be required for each motor. If one of the motors cannot produce torque or can no longer produce sufficient torque, the brake associated therewith may have to be actuated, since otherwise the motor may adopt an undefined rotational speed which may oppose the intended movement. In power control units having torque-adding coupling gear units, a coupling is often further required in addition to the brake. The actuation unit is known as a control valve in a hydraulic motor and as motor control electronics (MCE) in an electric motor.

Furthermore, a number of components may be necessary for the required redundancy. A coupling gear unit connecting the two drive trains may also be necessary, and this may result in additional weight. If there is a fault, the high lift system may continue to be available at a reduced speed. This must be brought about by the gear unit in the rotational-speed-adding solution, and it is intended in the torque-adding solution so as to keep the component weight as low as possible.

For example, motors for high lift systems in which a coupling gear unit is configured as a speed-adding gear unit may be used. Two hydraulic motors may be used, and may form a first and a second drive train. In terms of the rotational speed, the coupling gear unit connects the two drive trains in such a way as to add the speed.

Other objects, desirable features and characteristics will become apparent from the subsequent summary and detailed description, and the appended claims, taken in conjunction with the accompanying drawings and this background.

SUMMARY

According to various embodiments of the present disclosure, provided is an improved drive for a high lift system.

A high lift system for an aircraft, an aircraft comprising a high lift system and the use of an electric motor as a drive for a high lift system are provided according to various embodiments.

The disclosed various exemplary embodiments apply equally to the high lift system, the aircraft and the use of the electric motor. In other words, features which are disclosed in the following in relation to the high lift system can also be implemented in the aircraft and applied during the use of the electric motor.

One exemplary embodiment of the present disclosure provides a high lift system for an aircraft which comprises a fully electric drive. In this case, the drive comprises an electric motor which drives a landing flap of the high lift system. The electric motor further has internal redundancy based on redundant windings.

In this and in any other embodiment, these windings may expediently be configured in such a way as to be largely mutually decoupled, mechanically, thermally and magnetically, in relation to a fault occurring in a winding group.

This redundant drive solution for the high lift system may make it possible to do without a coupling gear unit. If there is a fault, there are no power losses, such as reduced retraction and extension speed of the landing flaps.

In other words, the electric motor of the high lift system drive has a phase topology having redundancy, making it a fault-tolerant electric motor. Since the high lift system according to the various teachings of the present disclosure constitutes a fully electric, internally redundant drive solution for landing flaps of an aircraft, and does not require a coupling gear unit because of the internal redundancy of the electric motor, there is only one drive train in the electric motor.

In this context, it is noted that the high lift system according to various embodiments does not have to have a coupling gear unit, but it is still possible for what is known as a reduction gear unit to be used. With this gear unit, the high rotational speed of the electric motor can be adapted to a desired rotational speed of the drive of the landing flaps. However, it should be distinguished from a coupling gear unit, which is not required for the high lift system according to various embodiments of the present disclosure. In other words, the drive does not comprise a gear unit in the electric motor.

A further advantage of the present disclosure may be that if there is a fault, the high lift system is available without any power losses, since the rotational speed of the electric motor remains the same if a redundant part has a fault. Consequently, the workload in the cockpit may not increase, despite an issue with or a fault occurring with a phase group. Also, the torque may if desired be provided unreduced, as will be disclosed in the following.

In this and in any other embodiment of the present disclosure, the term "landing flap", as well as a leading edge flap, a trailing edge flap and a slat, should generally be understood to be a component of an aircraft which is driven to increase or reduce the lift, and is therefore retracted and extended by the drive according to the present disclosure. Further, any embodiment disclosed in the following may comprise a landing flap of this type.

An advantage of this internally redundant solution of the drive of the high lift system is that if a fault occurs, this has no effect on the rotational speed of the electric motor, and that the high lift system can be retracted and extended at the same speed as is conventional in fault-free operation. This means that at the level of the aircraft, there are thus no compromises on power or functionality, even if a fault occurs in a component.

In this drive solution for the high lift system, the power control unit (PCU) comprises an electric motor, which has the redundancy based on a corresponding phase topology. Further, a single brake for locking the system is sufficient for the high lift system according to the present disclosure, since there is only one motor shaft to be braked. A coupling is also not required in the drive train. This saves on weight and results in lower maintenance costs.

In this context, the electric motor in this and in any other embodiment may, in a known manner, comprise permanent magnets on the rotor and different coils on the stator. The coil or phase windings may be configured to be either distributed or concentrated. The rotor is set in movement by corresponding actuation of the individual windings or winding groups, since the rotor follows the external rotating magnetic field.

In this context, in this and in any other embodiment, an aircraft may be an aeroplane, a helicopter or a spacecraft.

In another exemplary embodiment of the present disclosure, the internal redundancy is configured as an m×n phase topology, n phases of the electric motor being combined into a phase group in each case. This results in m submotors in the electric motor. Further, the electric motor is configured in such a way that all m submotors are connected, without a gear unit, to a single shaft of the electric motor.

For example, 3×3 topologies, 2×3 topologies, 5×1 topologies or 6×1 topologies may be set up. However, other topologies are also possible.

In one exemplary embodiment of the present disclosure, the electric motor comprises only one drive train.

The redundant windings within the individual coils of the electric motor result in m submotors. Thus, by contrast with the prior art, it is not necessary to provide a second, separate motor, and it is likewise not necessary to provide a coupling gear unit which couples these two separate motors of these two separate drive trains. The present disclosure avoids this, and discloses a completely internal redundant drive solution. This reduces the susceptibility to faults, since there is no second motor or coupling gear unit. This saves on additional weight and costs. In terms of the torques thereof, the m submotors of the electric motor act on one and the same shaft of the electric motor, without a gear unit connected in between.

Since there is only one shaft, the submotors are operated at the same rotational speed.

In another exemplary embodiment of the present disclosure, the individual submotors of the single electric motor are configured in such a way that they each provide the same rotational speed and/or the same torque.

In this context, the individual submotors can be adapted accordingly by way of the number of windings thereof and the electric current flowing therethrough. The current can be controlled via control electronics. In this context, the current control may be part of a control cascade having superposed speed and/or position control.

In an exemplary embodiment of the present disclosure, each of the m submotors provides a torque, and the electric motor is configured in such a way that the torques of the submotors are added together to drive the landing flaps.

As can be seen for example in FIGS. 5 and 6, each individual torque of each submotor acts on the same shaft, and as an overall result they are added to give a total torque which is used to drive a landing flap in the high lift system.

In one embodiment of the present disclosure, the electric motor is configured in such a way that if a fault occurs with a submotor and/or a phase group, the rest of the electric motor remains intact and can provide a predefined motor output power.

In this context, the predefined motor output power may correspond to the nominal torque which is required for operating the high lift system.

In another exemplary embodiment of the present disclosure, the high lift system comprises the landing flap, a predefined nominal torque being required for the electric motor to drive the landing flap. Further, the electric motor is configured in such a way that if a submotor and/or a phase group fail, the nominal torque Mn for driving the landing flap can be provided by the rest of the electric motor, which remains intact.

In other words, the windings of the m submotors, the magnetic circuit and the control units are adapted in such a way that m-1 submotors provide the required nominal torque.

Electric motors are particularly suitable for short-term torque peaks, which may be about three to about five times the nominal torque, depending on the type and configuration of the motor.

In one embodiment, the electric motor is configured to have multiple redundancy, in such a way that if k submotors fail (with the restriction m>k≥1), the remaining m−k submotors of the electric motor remain intact and can provide the nominal torque for driving the landing flap. If, in accordance with an embodiment, the torque is distributed uniformly among the functioning submotors, the torque Mt to be provided by a submotor comes to Mt=Mn/m−k. Thus, the fully intact electric motor is configured in such a way that it can provide m/(m−k) times the predefined nominal torque.

In another embodiment, the electric motor has a 3×3 phase topology and the electric motor has single redundancy, and thus each of the three submotors can provide about 50% of the predefined nominal torque for driving the landing flap.

In other words, a fully intact electric motor of this type provides about 150% of the predefined nominal torque. In the situation where a submotor fails, the two remaining submotors together still provide the required power or the nominal torque to be able to retract and extend the landing flaps safely and reliably at an unreduced speed.

In one embodiment of the present disclosure, the electric motor has a 2×3phase topology, the electric motor having single internal redundancy, and thus each of the two submotors can provide a total predefined nominal torque for driving the landing flaps.

In other words, this electric motor is dimensioned in such a way that in the intact situation, where the two submotors are working reliably, double the nominal power or double the nominal torque which is required for driving the landing flaps reliably is provided. If one of the two submotors fails, the second submotor remains intact and can safely and reliably ensure the extension and retraction of the landing flaps at the unreduced speed by itself. This does not lead to a time delay, since both the rotational speed and the nominal torque are provided by the remaining electric submotor.

In another exemplary embodiment of the present disclosure, the drive comprises control electronics for the electric motor. In this case, the control electronics are configured in such a way that if a submotor and/or a phase group fail, an increase in current is brought about within the remaining intact submotors and phase groups. The control electronics carry out the current increase in such a way that it does not cause the torque to fall below a nominal torque. For this purpose, the high lift system may comprise sensor electronics, which detect the failure of a submotor and transmit a signal to the control electronics of the electric motor to increase the current (compensation).

In one embodiment, the current increase may also be provided indirectly by engaging the superposed speed and/or position control. For this purpose, it is not necessary for the fault to be detected by the control electronics or for there to be a specific reaction to the occurrence of a fault.

In another embodiment of the present disclosure, the high lift system is configured to drive the landing flap exclusively electrically.

In other words, there is no hydraulic motor in the high lift system according to the various embodiments of the present disclosure. There is also no combination of for example two hydraulic motors in a duplex system, or a hybrid motor formed from a hydraulic motor and an electric motor in a duplex system.

In one embodiment of the present disclosure, the electric motor is configured in such a way that if one or more submotors and/or a phase group fail, the rotational speed of the electric motor is not affected.

Because of the arrangement according to the various teachings of the present disclosure of the various submotors, which are provided by the internally redundant drive solution by redundant windings of the electric motor, and since these submotors all constitute a common drive train and no coupling gear unit is used, the rotational speed of individual submotors of the electric motor is not reduced if a submotor fails. Likewise, if the nominal torque is to be kept constant if a failure occurs, according to the exemplary embodiment disclosed above, the current can be increased or compensated using the control electronics. For this purpose, the high lift system may comprise sensor electronics, which detect the failure of a submotor and transmit a signal to the control electronics of the electric motor to increase the current (compensation).

In another embodiment of the present disclosure, the drive comprises a single internally redundant brake for locking.

In principle, any suitable prior art brake may be selected for this purpose. In one of various embodiments, the brake may be selected from the group comprising a hydraulic brake, an electric brake, a spring-actuated electrically releasable brake, a spring-actuated hydraulically releasable brake, a permanent-magnet-actuated electrically releasable brake, a spring-actuated electrically releasable brake having a magnet winding and having an electronic unit for releasing the brake, and any combination thereof.

In one embodiment, a brake can be used which is actuated, without any external action, by one or more springs or one or more permanent magnets, and which can be released electrically by an internally redundant electromagnet having at least two redundant windings, in such a way that an electronic unit is associated with each winding and can release the brake by passing current through the winding.

In this context, the magnetic component of the brake and the magnet body which carries the flux are in any case only required in a simple configuration. The same applies to the use of a hydraulically releasable brake.

Another exemplary embodiment of the present disclosure provides an aircraft comprising a high lift system according to any one of the preceding embodiments.

One exemplary embodiment provides the use of an electric motor, having internal redundancy as a result of redundant windings, as a drive for a high lift system.

A fundamental idea of the present disclosure is to configure an electric motor redundantly in terms of the wirings thereof, resulting in a plurality of independent submotors. These submotors are actuated mutually independently. This electric motor, which has a plurality of submotors as a result of the internally redundant solution, does not require a coupling gear unit for the submotors, but provides a reliable redundant solution for driving a high lift system of an aircraft. In this context, the drive of this high lift system still provides the same rotational speed even if a submotor fails.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
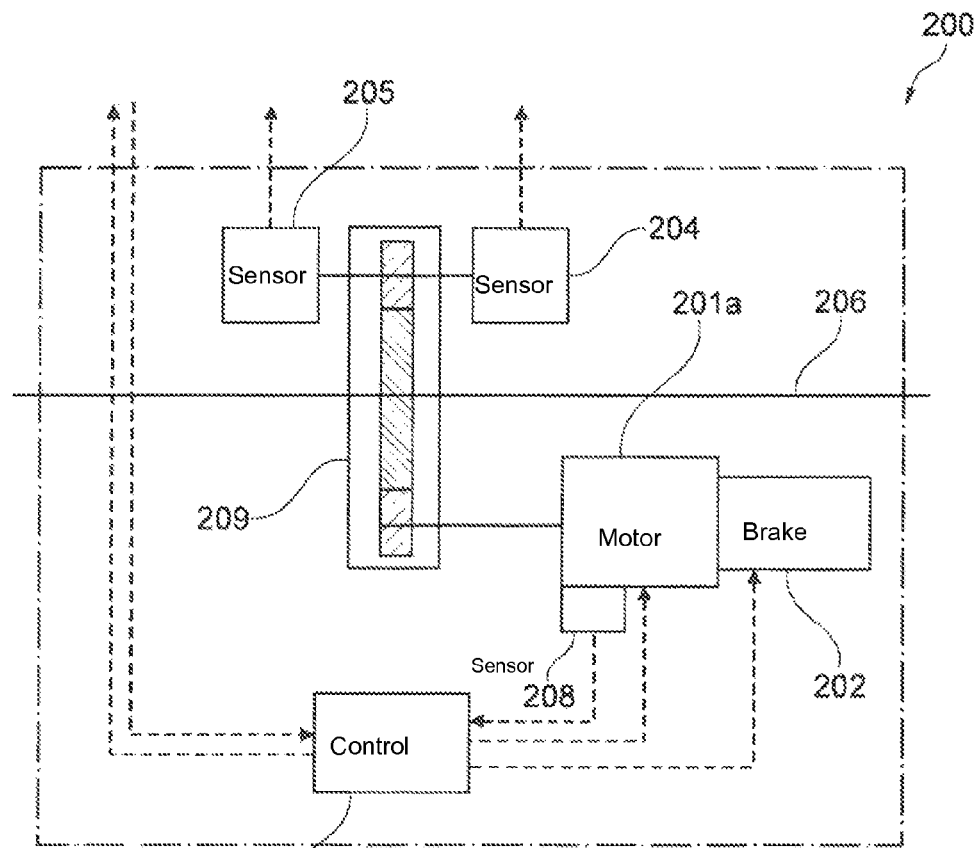
FIG. 1 is a schematic, two-dimensional drawing of a power control unit of a high lift system according to various embodiments of the present disclosure.

FIG. 1 shows an exemplary embodiment of the present disclosure. FIG. 1 shows a fully electric, internally redundant drive 200, which is used in a high lift system for an aircraft according to various embodiments. The drive comprises an electric motor 201a, which drives a landing flap (not shown) of the high lift system. In this context, the electric motor 201a is distinguished by an internal redundancy resulting from redundant wirings.

An internally redundant brake 202 is also shown; it should be emphasized that only a single brake is required to lock the entire drive system. Control electronics 203a are also shown, and actuate the phase groups of the various submotors of the electric motor 201a. In this context, it is also possible for the individual submotors each to be controlled separately by respective control electronics, as is shown for example in FIG. 4.

The shaft 206, to which the electric motor 201a transfers the overall torque, is also shown. A reduction gear unit 209 is also shown, with which the rotational speed of the electric motor 201a can be adapted to the respective application. For example, about 350 rpm is conventional for retracting and extending landing flaps. Other, different values are also possible, however. Further, the predefined nominal torque may be about 170 Nm. Other, different values are also possible, however. Further, sensors 204 and 205 are shown, the sensor 204 being used to compare whether the landing flaps are being extended equally on the right and left wing of the aircraft. By contrast, the sensor 205 communicates the values to the crew in the cockpit. Further, a sensor unit 208 is attached to the electric motor 201a.

An advantage of the present disclosure is that if there is a fault, the high lift system is available without power losses. Consequently, the workload in the cockpit does not increase, in spite of issues with a phase group.

Figure 2:
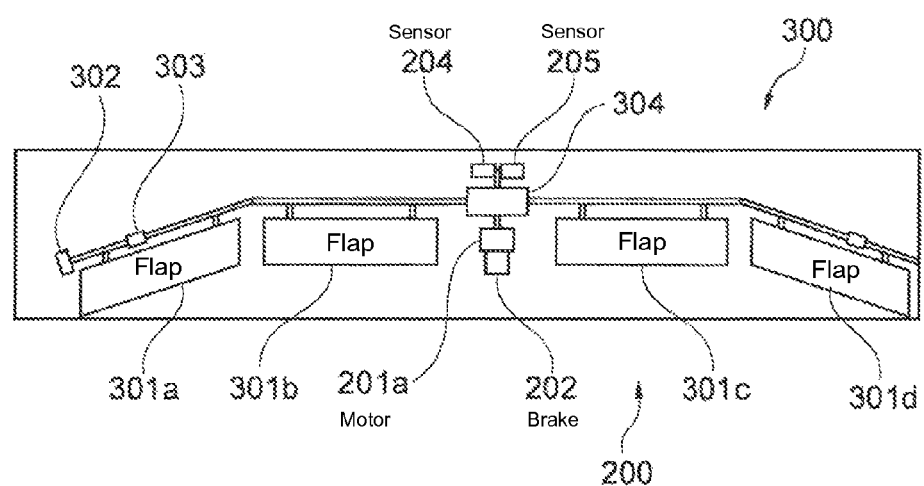
FIG. 2 is a schematic, two-dimensional drawing of a high lift system according to various embodiments.

FIG. 2 shows a high lift system 300 for an aircraft having a fully electric drive 200 according to an exemplary embodiment of the present disclosure. The drive has an electric motor 201a, which drives the four landing flaps 301a-301d shown here of the high lift system. In this case, the electric motor 201a has an internal redundancy as a result of redundant windings and is therefore a fault-tolerant electric motor. Based on the teachings of the present disclosure, it is possible to do without a coupling gear unit in the electric motor. The internally redundant brake 202 is further shown.

The two sensors 204 and 205, illustrated previously in FIG. 2, are also shown. The reduction gear unit 304 is shown outside the electric motor 201a. Because of the internally redundant drive solution of the high lift system 300, the occurrence of a fault has no effect on the rotational speed of the electric motor, in such a way that the high lift system can be retracted and extended at the same speed as is conventional in fault-free operation. This is made possible by the redundant winding, illustrated in greater detail hereinafter in FIGS. 5 and 6, of the coils of the electric motor. By means of control electronics (not shown in this case), if a submotor fails, the torques of the remaining motors can be increased by current compensation.

Figure 3:
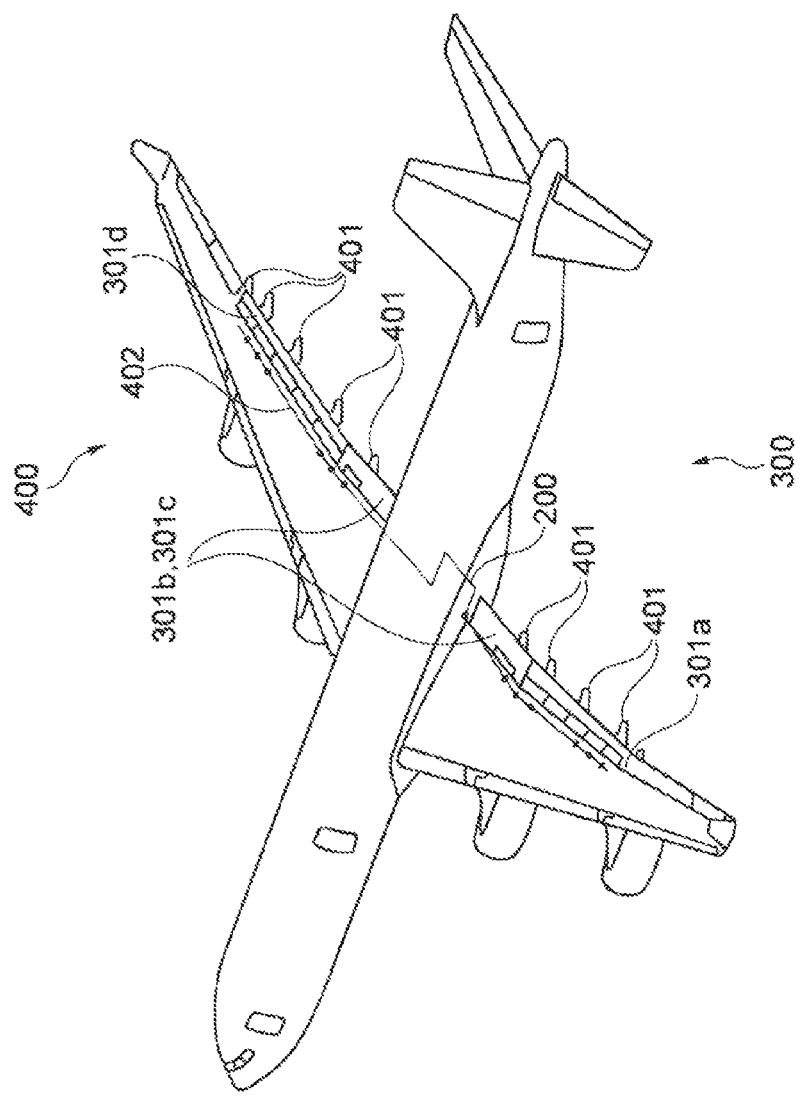
FIG. 3 is a schematic, two-dimensional drawing of an aircraft comprising a high lift system according to various embodiments.

FIG. 3 shows an aircraft 400 comprising a high lift system 300, which has a fully electric drive 200. In this case, what are known as flaptracks 401 are shown, in addition to the components which are shown in FIGS. 1 and 2 and which are incorporated into the aircraft 400 in this case. In this aircraft, the high lift system 300 of FIG. 2 may for example be integrated with the fully electric, internally redundant drive 200 of FIG. 1. Other combinations are also possible, however. One of the motors from FIGS. 4 and 5 may also be integrated into the aircraft 400. Other motors according to the present disclosure may also be used, however.

Figure 4:
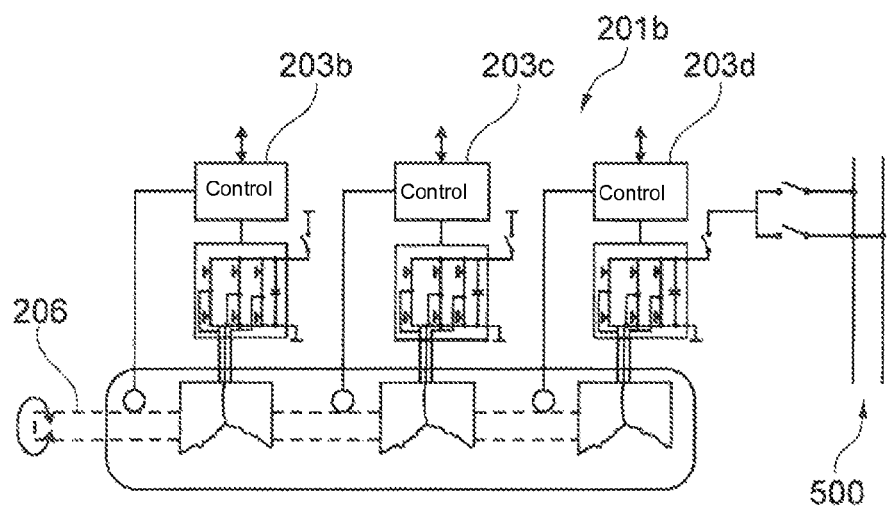
FIGS. 4 and 5 are schematic, two-dimensional drawings of electric motors according to various embodiments of the present disclosure.
Figure 5:
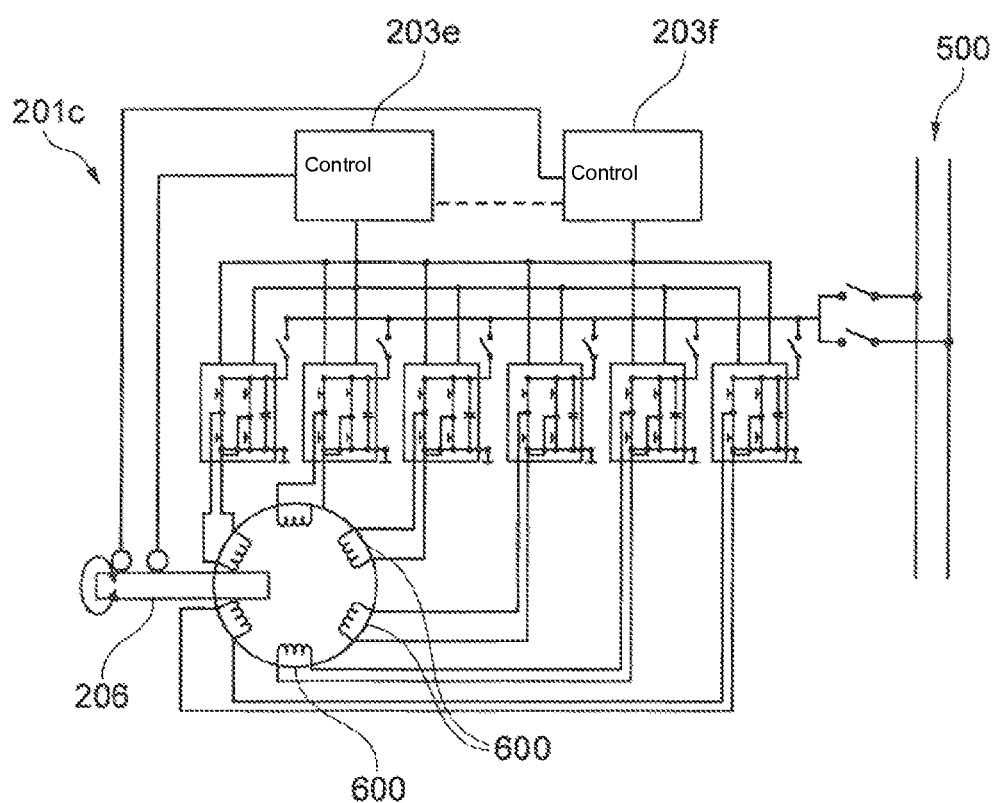

FIG. 4 shows an electric motor 201b of a high lift system according to an exemplary embodiment of the present disclosure. In this case, the motor 201b is configured as an internally redundant electric motor having a 3×3 phase topology. In other words, it comprises three submotors, each having three windings. The individual 3 submotors are actuated mutually independently by the control electronics 203b to 203d. The shaft 206 is also shown in FIG. 5. The schematically shown current supply is denoted by reference numeral 500. In other words, this motor comprises nine phases and comprises three submotors. This motor may, according to various embodiments, be used to drive a high lift system (300, not shown in this case) for an aircraft (400, not shown in this case). This results in a high lift system which comprises a fully electric drive (200, not shown in this case), the drive comprising an electric motor (201b) which drives a landing flap (301a-301d, not shown in this case) of the high lift system. In this context, the electric motor has internal redundancy based on redundant windings. An advantage of the electric motor 201b is that if there is a fault, the high lift system is available without any power losses, since the rotational speed of the electric motor remains the same if a redundant part fails. Consequently, the workload in the cockpit does not increase, despite these issues. Also, the torque can if desired be provided unreduced, as was disclosed previously.

FIG. 5 shows another exemplary embodiment of an electric motor 201c having a 6×1 phase topology. First and second control electronics 203e and 203f are shown. However, separate regulation or control of the phase groups is also possible, as is shown by way of example in FIG. 4. The coils 600 can also be seen, and are located in the region of the stator. The shaft 206 is also shown. This redundant drive solution for a high lift system of an aircraft makes it possible to do without a coupling gear unit. It can thus advantageously be made possible for there to be no power losses or reduction in speed when retracting and extending the landing flaps in the case of a fault. In other words, the electric motor 201c of the high lift system drive has a phase topology having redundancy, making it a fault-tolerant electric motor. Since the high lift system according to the present disclosure having this motor 201c constitutes a fully electric, internally redundant drive solution for landing flaps of an aircraft, and does not require a coupling gear unit because of the internal redundancy of the electric motor, there is only one drive train in the electric motor. This saves valuable weight. In other words, this drive does not comprise a gear unit in the electric motor 201c.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A high lift system for an aircraft, the high lift system comprising:
   a fully electric drive including an electric motor which drives a landing flap of the high lift system,
   wherein the electric motor has internal redundancy due to redundant windings,
   wherein the internal redundancy is configured as an m×n phase topology,
   wherein n phases of the electric motor are combined into a phase group in each case, resulting in m submotors,
   wherein the electric motor is configured in such a way that all m submotors are connected, without a gear unit, to a single shaft of the electric motor,
   wherein the drive further comprises control electronics of the electric motor, and the control electronics are configured in such a way that if at least one of the submotors and the phase groups fail, they bring about an increase in current within the remaining intact submotors and phase groups, and
   wherein the control electronics are configured to carry out the current increase in such a way that it does not cause the torque to fall below a nominal torque.

2. The high lift system according to claim 1, wherein the electric motor comprises only one drive train.

3. The high lift system according to claim 2, wherein the individual submotors are configured in such a way that they each provide at least one of the same rotational speed and the same torque.

4. The high lift system according to claim 1,
wherein each submotor provides a torque, and
wherein the electric motor is configured in such a way that the torques of the submotors are added to drive the landing flap.

5. The high lift system according to claim 1,
wherein the electric motor is configured in such a way that if at least one of the submotors and the phase groups fail, a predefined motor output power is provided by the rest of the electric motor, which remains intact.

6. The high lift system according to claim 1,
wherein the high lift system comprises the landing flap, and a nominal torque is required for the landing flap to be driven by the electric motor, and
wherein the electric motor is configured in such a way that if at least one of the submotors and the phase groups fail, the nominal torque for driving the landing flap is provided by the rest of the electric motor, which remains intact.

7. The high lift system according to claim 1,
wherein the electric motor has a 3×3 phase topology, and
wherein the electric motor has single redundancy, and thus each of the 3 submotors provide about 50% of a predefined nominal torque for driving the landing flap.

8. The high lift system according to claim 1,
wherein the electric motor has a 2×3 phase topology, and
wherein the electric motor has single redundancy, and thus each of the two submotors provide a total predefined nominal torque for driving the landing flap.

9. The high lift system according to claim 1,
wherein the high lift system is configured to drive the landing flap exclusively electrically.

10. The high lift system according to claim 1,
wherein the electric motor is configured in such a way that a failure of at least one of the submotors and the phase groups does not affect the rotational speed of the electric motor.

11. The high lift system according to claim 1,
wherein the drive has a single internally redundant brake for locking.

12. An aircraft, comprising:
a high lift system that includes a fully electric drive having an electric motor which drives a landing flap of the high lift system,
wherein the electric motor has internal redundancy due to redundant windings, and the internal redundancy is configured as an m×n phase topology,
wherein n phases of the electric motor are combined into a phase group in each case, resulting in m submotors,
wherein the electric motor is configured in such a way that all m submotors are connected, without a gear unit, to a single shaft of the electric motor,
wherein the drive further comprises control electronics of the electric motor, and the control electronics are configured in such a way that if at least one of the submotors and the phase groups fail, they bring about an increase in current within the remaining intact submotors and phase groups, and
wherein the control electronics are configured to carry out the current increase in such a way that it does not cause the torque to fall below a nominal torque.

13. The aircraft according to claim 12,
wherein n phases of the electric motor are combined into a phase group in each case, resulting in m submotors, and
wherein the electric motor is configured in such a way that all m submotors are connected, without a gear unit, to a single shaft of the electric motor.

14. The aircraft according to claim 13,
wherein the electric motor comprises only one drive train.

15. The aircraft according to claim 14,
wherein the individual submotors are configured in such a way that they each provide at least one of the same rotational speed and the same torque.

16. The aircraft according to claim 13,
wherein each submotor provides a torque, and
wherein the electric motor is configured in such a way that the torques of the submotors are added to drive the landing flap.

17. The aircraft according to claim 13,
wherein the electric motor is configured in such a way that if at least one of the submotors and the phase groups fail, a predefined motor output power is provided by the rest of the electric motor, which remains intact.

18. The aircraft according to claim 13,
wherein the high lift system comprises the landing flap, and a nominal torque is required for the landing flap to be driven by the electric motor, and
wherein the electric motor is configured in such a way that if at least one of the submotors and the phase groups fail, the nominal torque for driving the landing flap is provided by the rest of the electric motor, which remains intact.

* * * * *